(No Model.)
W. R. EYNON.
GRINDING MILL.
No. 338,221. Patented Mar. 16, 1886.
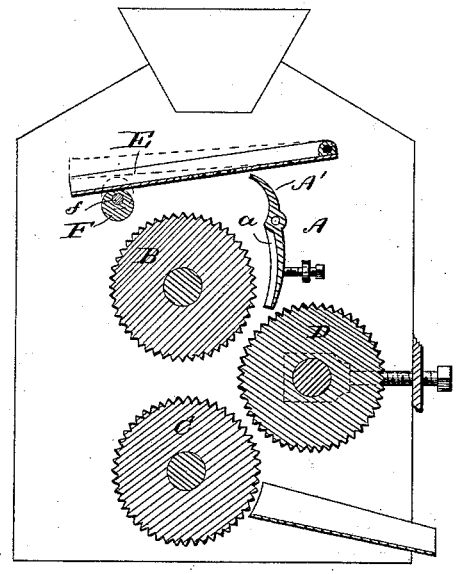
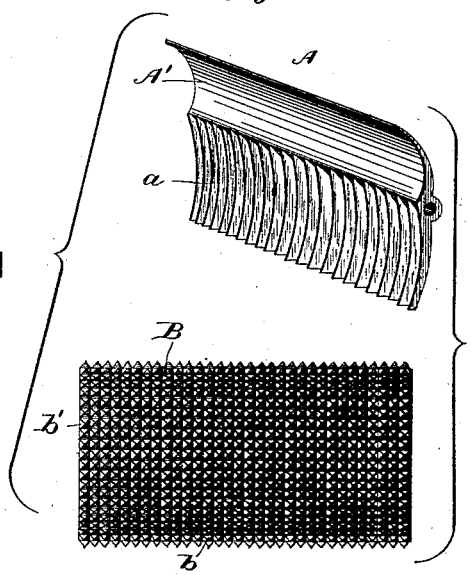
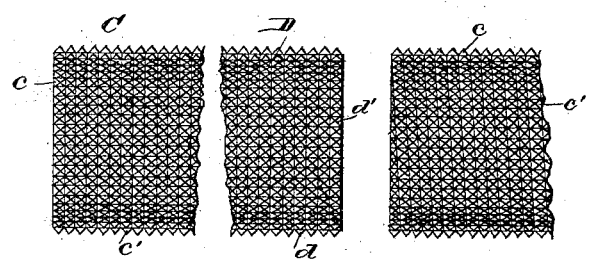
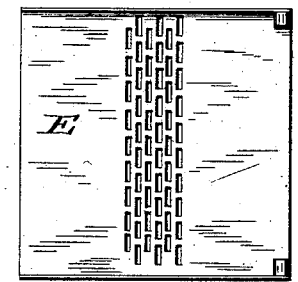
Witnesses.
Chas. R. Burr
A. J. Stewart
Inventor.
William R. Eynon
by Franck D. Johns
His Attorney.

UNITED STATES PATENT OFFICE.

WILLIAM R. EYNON, OF CLEVELAND, OHIO, ASSIGNOR OF ONE-HALF TO JAMES W. FIELD, OF SAME PLACE.

GRINDING-MILL.

SPECIFICATION forming part of Letters Patent No. 338,221, dated March 16, 1886.

Application filed September 19, 1885. Serial No. 177,573. (No model.)

*To all whom it may concern:*

Be it known that I, WILLIAM R. EYNON, a citizen of the United States, residing at Cleveland, in the county of Cuyahoga and State of Ohio, have invented certain new and useful Improvements in Grinding-Mills; and I do hereby declare the following to be a full, clear, and exact description of the invention, such as will enable others skilled in the art to which it appertains to make and use the same.

My invention relates to improvements in grinding-mills; and it consists in certain novelty of construction and arrangement of the various parts, all of which I will now proceed to describe and claim, reference being had to the accompanying drawings.

Figure 1 is a vertical section of a mill embodying my invention. Fig. 2 is a perspective of the concave and cylinder, showing the arrangement of the corrugations. Figs. 3, 4, and 5 are details showing arrangement of the corrugations on the additional grinding-rolls. Fig. 6 is a plan of the shaker.

Referring to said drawings, A is an adjustable concave having corrugations $a$, which run in the direction of the feed of the material being ground, and are vertical, or nearly so.

A' is an upwardly-curved extension or hood, which catches the material being ground as it rebounds from the cylinder, and prevents it from being thrown over said concave or out of the mill.

B is a cylinder operating in connection with the concave and having both longitudinal corrugations $b$ and annular corrugations $b'$, the longitudinal corrugations being at right angles to the corrugations on the concave.

C is a cylinder or grinding-roll, located below the cylinder B, and is provided with both annular and longitudinal corrugations $c$ $c'$, the annular corrugations being cut in parallel rings, as shown in Fig. 3, or in one continuous right or left spiral thread, as shown in Fig. 5, of any desired pitch or space between the same.

D is an adjustable cylinder or grinding-roll, adjusted by sliding boxes and screws, as shown, or by other suitable means, and is provided with both annular and longitudinal corrugations, $d$ $d'$, arranged in a similar manner to those on the cylinder C, above described.

The grinding-roll D is located below the concave and co-operates with the cylinder B, to make a second reduction, and with the cylinder or grinding-roll C, to make a third and final reduction. Said grinding-rolls C and D revolve in opposite directions at a variable rate of speed and feed in the same direction.

E is a shaker or screen located above the cylinder and concave, and is provided with oval or circular holes of sufficient size to allow the grain to fall through as it is fed from the hopper to the shaker, but which will prevent pieces of wire, nails, and other hard substances from getting into the mill.

The shaker is hinged at one end to the frame of the mill, and is operated by suitable eccentrics, F, mounted on a shaft, $f$, which is operated by any suitable means.

The operation of my mill is as follows: The material to be ground is fed from the hopper to the shaker E and, dropping through the holes $e$, passes between the cylinder B and concave A. The hood or curved extension of the concave prevents any grain from being thrown over said concave as it rebounds from the cylinder B. As the material passes between the cylinder and concave a first reduction takes place, the vertical corrugations on the concave feeding more freely and rendering the mill less liable to become choked than when the corrugations on the concave are parallel to those on the cylinder. This is particularly noticeable when grinding corn or oats. After the grain passes between the cylinder and concave a second reduction takes place as it passes between the cylinder B and grinding roll or cylinder D. It then falls upon the grinding-roll C, and a third and final reduction takes place as it is fed between the grinding-rolls C and D.

Having thus fully described my invention, I claim as new and desire to secure by Letters Patent—

1. A grinding-mill comprising the concave A, having vertical corrugations, the cylinder B, having both longitudinal and annular corrugations, and cylinders C and D, having both longitudinal and annular corrugations, all arranged and operating substantially as shown and described.

2. A grinding-mill comprising the concave A, having the hood A' and vertical corrugations, the cylinder B, having both annular and longitudinal corrugations, and the cylinders C and D, having both annular and longitudinal corrugations, all arranged and operating substantially as shown and described.

In testimony whereof I affix my signature in presence of two witnesses.

WILLIAM R. EYNON.

Witnesses:
J. C. HOHING,
ADOLPH HAAS.